US010515467B2

(12) United States Patent
Bippus et al.

(10) Patent No.: US 10,515,467 B2
(45) Date of Patent: Dec. 24, 2019

(54) IMAGE RECONSTRUCTION SYSTEM, METHOD, AND COMPUTER PROGRAM

(71) Applicant: KONINKLIJKE PHILIPS N.V., Eindhoven (NL)

(72) Inventors: Rolf Dieter Bippus, Hamburg (DE); Frank Bergner, Hamburg (DE)

(73) Assignee: KININKLIJKE PHILIPS N.V., Eindhoven (NL)

( * ) Notice: Subject to any disclaimer, the term of this patent is extended or adjusted under 35 U.S.C. 154(b) by 153 days.

(21) Appl. No.: 15/546,287

(22) PCT Filed: Jan. 20, 2016

(86) PCT No.: PCT/EP2016/051043
§ 371 (c)(1),
(2) Date: Jul. 26, 2017

(87) PCT Pub. No.: WO2016/124395
PCT Pub. Date: Aug. 11, 2016

(65) Prior Publication Data
US 2019/0147628 A1     May 16, 2019

(30) Foreign Application Priority Data
Feb. 3, 2015  (EP) ..................... 15153654

(51) Int. Cl.
*G06T 11/00*     (2006.01)
*G06F 17/18*     (2006.01)
(Continued)

(52) U.S. Cl.
CPC ............ *G06T 11/006* (2013.01); *G06F 17/18* (2013.01); *G06T 5/002* (2013.01); *G06T 7/0002* (2013.01); *G06T 2211/424* (2013.01)

(58) Field of Classification Search
CPC .............. G06T 7/50; G06T 7/55; G06F 17/18
See application file for complete search history.

(56) References Cited

U.S. PATENT DOCUMENTS 6,324,242 B1   11/2001  Pan
9,478,049 B2   10/2016  Bippus
(Continued)

OTHER PUBLICATIONS

Shi, "Fast Regularization Design for Tomographic Image Reconstruction for Uniform and Isotropic Spatial Resolution", The University of Michigan (2008.
(Continued)

*Primary Examiner* — Dwayne D Bost
*Assistant Examiner* — Stephen M Brinich
(74) *Attorney, Agent, or Firm* — Larry Liberchuk

(57) ABSTRACT

The present invention relates to an image reconstruction system for statistically reconstructing images from transmission measurements. The image reconstruction system comprises an update equation providing unit for providing an update equation based on an iterative statistical model. The update equation comprises a data term and a regularization term. The invention proposes to not modify the regularization term, but rather the weights with which individual measurements contribute are modified on a per image voxel and per measurement basis. This is achieved by modifying the contributions of each measurement by including an additional weight on a per image voxel/per measurement basis. The additional weight for each measurement is determined by calculating the noise perpendicular to each measurement ray at each voxel position and a voxel and measurement dependent weight for each measurement, and integrated into the update equation's data term.

14 Claims, 2 Drawing Sheets

(51) Int. Cl.
*G06T 5/00* (2006.01)
*G06T 7/00* (2017.01)

(56) References Cited

U.S. PATENT DOCUMENTS

| | | | |
|---|---|---|---|
| 2013/0251286 A1 | 9/2013 | Brendel | |
| 2013/0336562 A1 | 12/2013 | Zamyatin | |
| 2013/0342705 A1* | 12/2013 | Huang | H04N 5/2351 348/169 |
| 2014/0029819 A1 | 1/2014 | Zeng | |
| 2015/0030227 A1* | 1/2015 | Liang | G06T 11/006 382/131 |
| 2017/0039706 A1* | 2/2017 | Mikhno | A61B 6/037 |

OTHER PUBLICATIONS

Nuyts, et al., "A Penalized-Likelihood Image Reconstruction Method for Emission Tomography, Compared to Post Smoothed Maximum-Likelihood with Matched Spatial Resolution", IEEE Transactions on Medical Imaging, vol. 22, pp. 1042 to 1052 (2003).
Fessler, et al., "Spatial Resolution Properties of Penalized-Likelihood Image Reconstruction: Space-Invariant Tomographs", IEEE Transactions on Image Processing, vol. 5, pp. 1346 to 1358 (1996).
Stayman, et al., "Regularization for uniform spatial resolution properties in penalized-likelihood image reconstruction", Medical Imaging, IEEE Transactions on, vol. 19, pp. 601 to 615 (2000).
Fessler, "Analytical approach to regularization design for isotropic spatial resolution", Nuclear Science Symposium Conference Record, 2003 IEEE, vol. 3, pp. 2022 to 2026 (2003).
Shi, et al., "Quadratic Regularization Design for 2-D CT", Medical Imaging, IEEE Transactions on, vol. 28, pp. 545 to 656 (2009).
Cho, et al., "Quadratic Regularization Design for 3D Axial CT", 12th International Conference on Fully 3D Image Reconstruction in Radiology and Nuclear Medicine, pp. 78-81.
Cho, et al., "Quadratic Regularization Design for 3D Axial CT: Towards Isotropic Noise", Nuclear Science Symposium and Medical Imaging Conference (NSS/MIC), 2013 IEEE, M22-31.
Zeng, et al., "Unmatched ProjectorlBackprojector Pairs in an Iterative Reconstruction Algorithm", IEEE Transactions on Medical Imaging, vol. 19, pp. 548 to 555 (2000).
Wunderlich, et al., "Achieving Uniform Noise in Direct Fan-beam CT Reconstruction Through Bowtie Filter Design", IEEE Nuclear Science Symposium Conference Record, 2007, 4379-4383.
Chun, et al., "Spatial Resolution Properties of Motion-Compensated Tomographic Image Reconstruction Methods", IEEE Transactions on Medical Imaging, vol. 31, No. 7, Jul. 2012.
Thibault, et al., "High Quality Iterative Image Reconstruction For Multi-Slice Helical CT", Aug. 2008.
Anderson, et al., "Simultaneous Algebraic Reconstruction Technique (SART): A Superior Implementation of the Art Algorithm", Ultrasonic Imaging 6, 81-94, 1984.

* cited by examiner

IMAGE RECONSTRUCTION SYSTEM, METHOD, AND COMPUTER PROGRAM

CROSS REFERENCE TO RELATED APPLICATIONS

This application is the U.S. National Phase application under 35 U.S.C. § 371 of International Application No. PCT/EP2016/051043, filed Jan. 20, 2016, published as WO 2016/124395 on Aug. 11, 2016, which claims the benefit of European Patent Application Number 15153654.7 filed Feb. 3, 2015. These applications are hereby incorporated by reference herein.

FIELD OF THE INVENTION

The invention relates to an image reconstruction system, an image reconstruction method, and an image reconstruction computer program for statistically reconstructing images from a plurality of transmission measurements.

BACKGROUND OF THE INVENTION

In iterative image reconstruction methods with regularization or image de-noising methods the problem is commonly formulated as a cost function consisting of a data term and a regularization term.

In statistical iterative reconstruction, the data term is based on a statistical model of the performed measurements while the regularization term incorporates a-priory knowledge about the image to reconstruct. The magnitude of the data term is affected by the data fidelity, which locally depends on the fidelity (variance) of the measurements contributing to the image at a certain location. The a-priori knowledge applied in the regularization typically favors smooth images (low frequency components over high frequencies) to accomplish noise reduction and is weighed by a factor $\beta$.

The statistical model for the performed measurements typically results in a certain balance/weighting between the contributions of the measurements and the a-priori model (penalty). The balancing weight considerably varies spatially over the image, resulting in non-uniform resolution or SNR respectively.

However the statistical weights also vary considerably among the measurements contributing to a single image location. The measurements thereby represent line integrals of rays through the voxel under different angles. Due to different weighting, those rays with larger weights contribute more in comparison to the regularization. The regularization penalty typically has an isotropic and spatially invariant characteristic, this in turn leads to anisotropic resolution and noise properties; the resolution perpendicular to those rays with larger weights is higher. This effect can be observed especially at the rim of objects, where rays tangential to the object's border see consistently less attenuation and thus less measurement noise compared to rays perpendicular to the border.

These are a well-known facts, and many researchers have tried to tackle this problem, at which the majority of literature deals with methods that try to achieve a homogeneous and isotropic resolution (cf. the dissertation "Fast Regularization Design for Tomographic Image Reconstruction for Uniform and Isotropic Spatial Resolution" by H. R. Shi, The University of Michigan (2008), and the article "A Penalized-Likelihood Image Reconstruction Method for Emission Tomography, Compared to Post Smoothed Maximum-Likelihood with Matched Spatial Resolution" by J. Nuyts et. al., IEEE Transactions on Medical Imaging, volume 22, pages 1042 to 1052 (2003), the article "Spatial Resolution Properties of Penalized-Likelihood Image Reconstruction: Space-Invariant Tomographs" by J. A. Fessler et. al., IEEE Transactions on Image Processing, volume 5, pages 1346 to 1358 (1996), the article "Regularization for uniform spatial resolution properties in penalized-likelihood image reconstruction" by J. Stayman et. al., Medical Imaging, IEEE Transactions on, volume 19, pages 601 to 615 (2000), the article "Analytical approach to regularization design for isotropic spatial resolution" by J. Fessler, Nuclear Science Symposium Conference Record, 2003 IEEE, volume 3, pages 2022 to 2026 (2003), and the article "Quadratic Regularization Design for 2-D CT" by H. Shi et. al., Medical Imaging, IEEE Transactions on, volume 28, pages 645 to 656 (2009)). All these methods are based on a modification of the regularization term.

Uniformity and isotropy of noise properties have only recently been studied for iterative reconstruction. As for resolution these methods are based on a modification of the regularization term and, more specifically, on linear regularization terms, such as "Quadratic Regularization Design for 3D Axial CT" by Jang Hwan Cho et al., 12th International Conference on Fully 3D Image Reconstruction in Radiology and Nuclear Medicine, pp 78-81 aiming at uniform noise characteristics and "Quadratic Regularization Design for 3D Axial CT: Towards Isotropic Noise" by Jang Hwan Cho et al., Nuclear Science Symposium and Medical Imaging Conference (NSS/MIC), 2013 IEEE, M22-31 aiming at isotropic noise characteristics.

SUMMARY OF THE INVENTION

Due to the properties of statistical iterative reconstruction, the data fidelity has a strongly varying magnitude within the image due to the strongly varying statistical weights derived from the contributing measurements:

Data fidelity strongly varies in total from the center towards the rim of the patient. At the rim, many measured rays that only encountered little attenuation (and thus have a high fidelity) contribute to high statistical weights and thus a high data fidelity term.

Data fidelity may further vary strongly among different rays contributing to a single image voxel. At any location where the contribution of rays is systematically different between two major, perpendicular directions (such as e.g. again at the outer rim of the patient), this results in anisotropic resolution and noise characteristic and impression.

Others have proposed methods to overcome both problems by modification of the regularization term in the update equation (cf. the article "Spatial Resolution Properties of Penalized-Likelihood Image Reconstruction: Space-Invariant Tomographs" by J. A. Fessler et. al., IEEE Transactions on Image Processing, volume 5, pages 1346 to 1358 (1996), the article "Regularization for uniform spatial resolution properties in penalized-likelihood image reconstruction" by J. Stayman et. al., Medical Imaging, IEEE Transactions on, volume 19, pages 601 to 615 (2000), the article "Analytical approach to regularization design for isotropic spatial resolution" by J. Fessler, Nuclear Science Symposium Conference Record, 2003 IEEE, volume 3, pages 2022 to 2026 (2003), and the article "Quadratic Regularization Design for 2-D CT" by H. Shi et. al., Medical Imaging, IEEE Transactions on, volume 28, pages 645 to 656 (2009) and "Quadratic Regularization Design for 3D Axial CT: Towards Isotropic Noise" by Jang Hwan Cho et al., Nuclear Science Symposium and Medical Imaging Conference (NSS/MIC), 2013 IEEE, M22-31).

This however is limited for multiple reasons: The typically used regularization uses a 3×3 in-plane window to calculate the potential function. The a-priori distribution (probability density function) is typically a Gibbs distribution of the form $$\frac{1}{Z \cdot e^{-\beta \cdot U(I)}},$$

where Z corresponds to a normalization constant, $\beta$ corresponds to the regularization parameter, and I corresponds to a respective image. The penalty is the negative log of the prior. $U(I)$ corresponds to an energy function, which is a weighted sum of potential functions applied to small neighborhoods of each voxel.

In its commonly used form, the parameters of this kind of regularization are spatially invariant and the neighborhood is chosen to be isotropic. That is, such an image prior does impose non-uniform or anisotropic behavior (noise or resolution) onto the image. In iterative, statistical CT reconstruction however, a noise model for the measured data is used, that in general results in statistical weights applied to each measurement. Each measurement thus contributes differently to the image. Due to the way data is measured in CT, the total contribution of measurements to a reconstructed image voxel varies spatially, resulting in non-uniform noise and resolution. In addition, the weight varies with the direction of each ray intersecting an image voxel along which a line integral is measured. The latter results in anisotropic noise and resolution.

To counteract the above other approaches aim at modification of the image penalty making it spatially varying based on the measurement noise in order to counteract non-uniformity and local anisotropy.

However the spatial influence, i.e. the neighborhood in which the potential functions contribute to the prior/penalty, is limited.

The non-linear character makes modifications difficult and restricts the spatial influence even further. Increasing the neighborhood on the other hand results in considerably more computational burden.

It is an object of the present invention to provide an improved image reconstruction system, an improved image reconstruction method, and an improved image reconstruction computer program for statistically reconstructing images from a plurality of transmission measurements.

The disadvantages of conventional approaches are overcome by the present invention in that not the regularization term is modified, rather the weights with which individual measurements contribute to each image location are modified on a per image voxel and per measurement basis aiming at a local weight distribution that results in a contribution of measured data that results in a more uniform an isotropic noise and/or resolution of the reconstructed image.

In a first aspect of the invention, there is provided an image reconstruction system for statistically reconstructing images from a plurality of transmission measurements comprising a transmission measurement providing unit for providing a plurality of transmission measurements; an update equation providing unit for providing an update equation based on an iterative statistical model, wherein said update equation comprises a data term and a regularization term; a processing unit for processing the measurements with an algorithm based on said statistical model which accounts for an energy variation of said plurality of transmission measurements to obtain at least one final component image which has reduced noise, wherein said update equation is employed by said processing unit; wherein said data term comprises a counteract weighting factor that is dependent on the respective voxel and on the respective measurement, wherein said counteract weighting factor modifies a statistical weight of said respective measurement.

As explained above, the present invention proposes to modify the weights with which individual measurements contribute are modified on a per image voxel and per measurement basis, rather than modifying the regularization term. Modification of the statistical weight of each contributing measurement is achieved by means of the counteract weighting factor. As the counteract weighting factor is dependent on the respective voxel and on the respective measurement, the weights with which individual measurements contribute are modified on a per image voxel and per measurement basis. The transmission measurement providing unit may comprise an input port configured to receive a plurality of transmission measurements. Additionally and/or alternatively, the transmission measurement providing unit may comprise a detector outputting a plurality of transmission measurements. The update equation providing unit may comprise an input port configured to receive an update equation. Additionally and/or alternatively, the update equation providing unit may comprise memory unit configured to store the update equation.

In statistical iterative reconstruction, the data term is based on a statistical model of the performed measurements while the regularization term incorporates a-priory knowledge about the image to reconstruct. The statistical model for the performed measurements typically results in a certain balance/weighting between the contributions of the measurements and the a-priori model (penalty). The balancing weight considerably varies spatially over the image, resulting in non-uniform resolution or SNR respectively. However the statistical weights also vary considerably among the measurements contributing to a single image location. This is what is meant when referring to accounting for an energy variation of said plurality of transmission measurements.

To address this energy variation, it is proposed to modify the weights with which individual measurements contribute on a per image voxel and per measurement basis, rather than modifying the regularization term. Modification of the statistical weight of each contributing measurement is achieved by means of the counteract weighting factor. As the counteract weighting factor is dependent on the respective voxel and on the respective measurement, the weights with which individual measurements contribute are modified on a per image voxel and per measurement basis.

Consequently, the expression "an energy variation of said plurality of transmission measurements" corresponds to the situation that a plurality of transmission measurements is carried out each at different X-ray energies.

In an embodiment, said data term further comprises a variance-based weighting factor. It is to be understood that the counteract weighting factor is not meant to correspond to the known factor $$\frac{1}{\sigma_i^2}$$

corresponding to the confidence level, but is an additional weighting factor modifying the known factor dependent on the respective voxel and on the respective measurement. Put differently, the counteract weighting factor accounts for a shifting of the confidence level "weights" such that the image impression to the user is improved.

In a further embodiment, said update equation reads $$\mu_j^{(n+1)} = \mu_j^{(n)} + \frac{\sum_{i=1}^{N_P}\left[a_{ij} \cdot \omega_{ij} \cdot \frac{1}{\sigma_i^2} \cdot (l_i - m_i^{(n)})\right] - \beta \cdot \dot{R}(\mu_j^{(n)})}{\sum_{i=1}^{N_P}\left[a_{ij} \cdot \omega_{ij} \cdot \frac{1}{\sigma_i^2} \cdot a_i\right] + \beta \cdot \ddot{R}(\mu_j^{(n)})},$$

wherein $\mu_j^{(n+1)}$ corresponds to the subsequent reconstructed value of a voxel j during iteration step n+1, $\mu_j^{(n)}$ corresponds to the value of said voxel j during iteration step n, $a_{ij}$ corresponds to the intersection of voxel j with a ray belonging to a measurement i, $\omega_{ij}$ corresponds to said counteract weighting factor, $\sigma_i$ corresponds to the variance of said measurement i, $l_i$ corresponds to a line integral measured during said measurement i, $m_i^{(n)}$ corresponds to a line integral for said measurement i simulated during iteration step n, $a_i$ corresponds to a normalization resulting from the mathematical optimization (i.e., the total contribution of one measurement to the full image), $N_P$ corresponds to the total number of measurements, $\beta$ corresponds to a regularization parameter, and R corresponds to a regularization term. Herein, the notation $\dot{R}$ and $\ddot{R}$ respectively corresponds to the first and second derivative with respect to the argument $\mu_j^{(n)}$. Whereas the set of $a_{ij}$ is determined by the overall imaging geometry, the set of $\omega_{ij}$ belongs to $\sigma_i$ in the sense that, as noted above, the counteract weighting factor accounts for a shifting of the confidence level "weights" such that the image impression to the user is improved.

In a further embodiment, a measurement ray having a ray direction is assigned to each measurement of said plurality of transmission measurements, and said counteract weighting factor is chosen to manipulate a contribution of said measurement ray depending on the respective voxel and depending on the respective ray direction.

In a further embodiment, said counteract weighting factor is dependent on a variance of the respective measurement.

In a further embodiment, said counteract weighting factor is proportional to a variance of the respective measurement. Choosing the counteract weighting factor accordingly aims to improve noise uniformity and noise isotropy in the reconstructed image.

In a further embodiment, said counteract weighting factor is proportional to $(\sigma_i)^n$, where $\sigma_i$ corresponds to a variance of the respective measurement, and where n is a real number.

In a further embodiment, a measurement ray having a ray direction is assigned to each measurement of said plurality of transmission measurements, and said counteract weighting factor is configured to counteract relative directional noise perpendicular to said ray direction.

In a further embodiment, said counteract weighting factor is proportional to a direction- and voxel-dependent confidence term.

In a further embodiment, said counteract weighting factor is determined by $$\omega_{ij} = \frac{(\sigma_i)^{n_d}}{\sum_v a_{vj}\cos^2(\varphi_v - \varphi_i)} \text{ or } \omega_{ij} = \frac{(\sigma_i)^{n_d}}{\sqrt{\sum_v a_{vj}^2 \cos^2(\varphi_v - \varphi_i)}}$$

wherein $a_{vj}$ corresponds to the intersection of voxel j with a ray belonging to a measurement v, $\omega_{ij}$ corresponds to said counteract weighting factor for voxel j and measurement i, $\sigma_i$ corresponds to the variance of said measurement i, $\omega_i$ corresponds to an angle of a measurement ray direction for measurement i, and where $n_d$ corresponds to a predetermined parameter.

In a further embodiment, said counteract weighting factor is determined by $$\omega_{ij} = \frac{1}{\left[\frac{\sigma_d^2(i,j)}{\sigma_d^2(j)}\right]^{n_d}}$$

$$\sigma_d^2(j) = \sum_v \frac{a_{vj}^2}{\sigma_v^2}$$

$$\sigma_d^2(i,j) = \sum_v \frac{a_{vj}^2}{\sigma_v^2}\cos^2(\varphi_v - \varphi_i),$$

wherein $a_{vj}$ corresponds to the intersection of voxel j with a ray belonging to a measurement v, $\omega_{ij}$ corresponds to said counteract weighting factor for voxel j and measurement i, $\sigma_v$ corresponds to the variance of said measurement v, $\omega_i$ corresponds to an angle of a measurement ray direction for measurement i, and where $n_d$ corresponds to a predetermined parameter.

In a further embodiment, $n_d$ is larger than or equal to 0, preferably larger than or equal to 0.6, more preferably larger than or equal to 0.75.

In a further embodiment, said image reconstruction system is further configured to normalize said counteract weighting factor by dividing said counteract weighting factor by $$\left(\sum_v \frac{a_{vj}^2 \omega_{vj}^2}{\sigma_v^2}\right)^{n_\omega}$$

wherein $\omega_{vj}$ corresponds to said counteract weighting factor for voxel j and measurement v, $a_{vj}$ corresponds to the intersection of voxel j with a ray belonging to a measurement v, $\sigma_v$ corresponds to the variance of said measurement v, and where $n_w$ corresponds to a predetermined parameter. Put differently, said counteract weighting factor is determined by $$\omega'_{ij} = \frac{\omega_{ij}}{\left(\sum_v \frac{a_{vj}^2 \omega_{vj}^2}{\sigma_v^2}\right)^{n_\omega}}$$

wherein $\omega_{ij}$ corresponds to said counteract weighting factor for voxel j and measurement i, $\omega_{ij}'$ corresponds to a normalized weighting factor to replace $\omega_{ij}$, $a_{vj}$ corresponds to the intersection of voxel j with a ray belonging to a measurement v, $\sigma_v$ corresponds to the variance of said measurement v, and where $n_w$ correspond to a predetermined parameter. By means of the above normalization, the embodiment aims to achieve improved noise uniformity, where $n_w$ may be chosen from the interval [0, 1]. Due to the dependency of measurement variances on the ray-direction, changes in the directional weighting pattern as introduced before in turn influence the noise uniformity (i.e., the data fidelity at the voxel). A corresponding choice of parameters leads to taking care of the uniformity of the noise, where anisotropic weighting becomes independent of the uniformity weighting in terms of parameterization through normalization.

In a further embodiment, $n_w$ is larger than or equal to 0, and preferably larger than or equal to 0.1. A preferred value is 0.25.

In an embodiment, parameters $n_d$ and $n_w$ are determined in an empirical fashion. Assuming that the optimal values of parameters $n_d$ and $n_w$ can be transferred from a first image reconstruction to a second image reconstruction that is different from the first image reconstruction, the parameters can be determined with a test sample, such as, e.g., a water phantom, and then used for the reconstruction of an actual medical image.

Any of the above embodiments can be combined with the embodiment that said update equation reads $$\mu_j^{(n+1)} = \mu_j^{(n)} + \frac{\sum_{i=1}^{N_P}\left[a_{ij} \cdot \omega_{ij} \cdot \frac{1}{\sigma_i^2} \cdot (l_i - m_i^{(n)})\right] - \beta \cdot \dot{R}(\mu_j^{(n)})}{\sum_{i=1}^{N_P}\left[a_{ij} \cdot \omega_{ij} \cdot \frac{1}{\sigma_i^2} \cdot a_i\right] + \beta \cdot \ddot{R}(\mu_j^{(n)})},$$

wherein $\mu_j^{(n+1)}$ corresponds to the subsequent reconstructed value of a voxel j during iteration step n+1, $\mu_j^{(n)}$ corresponds to the value of said voxel j during iteration step n, $a_{ij}$ corresponds to the intersection of voxel j with a ray belonging to a measurement i, $\omega_{ij}$ corresponds to said counteract weighting factor, $\sigma_i$ corresponds to the variance of said measurement i, $l_i$ corresponds to a line integral measured during said measurement i, $m_i^{(n)}$ corresponds to a line integral for said measurement i simulated during iteration step n, $a_i$ corresponds to a normalization resulting from a mathematical optimization, $N_P$ corresponds to the total number of measurements, $\beta$ corresponds to a regularization parameter, and R corresponds to a regularization term. Herein, the notation $\dot{R}$ and $\ddot{R}$ respectively corresponds to the first and second derivative with respect to the argument $\mu_j^{(n)}$.

In a further aspect, there is provided an image reconstruction method for statistically reconstructing images from a plurality of transmission measurements, the method comprising the steps of providing a plurality of transmission measurements; providing an update equation based on an iterative statistical model, wherein said update equation comprises a data term and a regularization term; processing the measurements with an algorithm based on said statistical model which accounts for an energy variation of said plurality of transmission measurements to obtain at least one final component image which has reduced noise, wherein said update equation is employed by said processing step; wherein said data term comprises a counteract weighting factor that is dependent on the respective voxel and on the respective measurement, and wherein said counteract weighting factor modifies a statistical weight of said respective measurement.

In a further aspect, there is provided an image reconstruction computer program for statistically reconstructing images from a plurality of transmission measurements, the image reconstruction computer program comprising program code means for causing the image reconstruction system for statistically reconstructing images from a plurality of transmission measurements to carry out the steps of the image reconstruction method for statistically reconstructing images from a plurality of transmission measurements, when the image reconstruction computer program is run on a computer controlling the image reconstruction system for statistically reconstructing images from a plurality of transmission measurements.

It shall be understood that the image reconstruction system for statistically reconstructing images from a plurality of transmission measurements, the image reconstruction method, and the image reconstruction computer program have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

A conventional CT scanner includes an x-ray tube that emits radiation. A source collimator is disposed between the x-ray tube and an examination region and collimates the emitted radiation to produce a fan or cone shaped x-ray beam. The collimated beam traverses the examination region and an object or subject therein (which attenuates the beam as a function of the radiodensity of the object or subject) and illuminates a detector array disposed across the examination region from the x-ray tube. The detector produces projection data indicative of the detected radiation. Projection data are reconstructed, thereby generating volumetric image data indicative of the object or subject.

Reconstruction algorithms include non-iterative reconstruction algorithms such as filtered back projection (FBP) and iterative reconstruction algorithms such as algebraic and statistical based reconstruction algorithms. Statistical iterative reconstruction algorithms have incorporated noise models by forming an equation describing the likelihood that the reconstructed image belongs to the measured projection data. This equation is used as an objective function for an iterative maximization method, and the result of the maximization is the image of an object that "most likely" produced the measured projection data.

The noise model can be incorporated by estimating the variances of all measurements in all projections and weighting the update contributions of measurements for one voxel with the reciprocals of the corresponding variances. If a reconstruction grid with overlapping basis functions is used (e.g. blobs) and/or if the reconstruction grid is coarse, a plurality of rays of each projection intersects the voxel or blob, and a number of measurements from neighboring detector pixels of each projection contribute to the update of the voxel or blob. Each of these measurements has an individual variance, which can differ significantly from each other if the associated rays suffer significantly different total attenuation.

Figure 1:
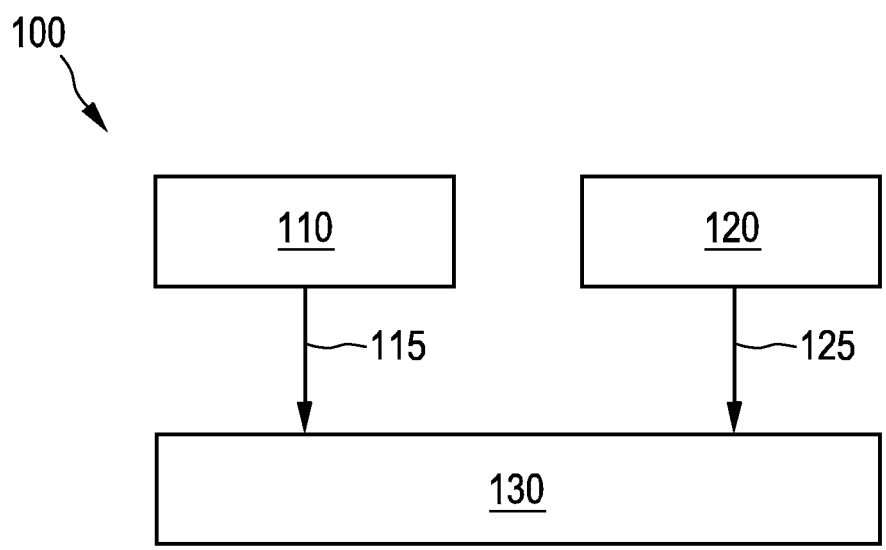
FIG. 1 shows schematically and exemplarily an embodiment of an image reconstruction system.

FIG. 1 shows schematically and exemplarily an embodiment of an image reconstruction system 100 in accordance with the present invention. Image reconstruction system 100 is suitable for statistically reconstructing images from a plurality of transmission measurements 115. Image reconstruction system 100 comprises a transmission measurement providing unit 110 for providing a plurality of transmission measurements 115, an update equation providing unit 120 for providing an update equation 125 based on an iterative statistical model, wherein said update equation 125 comprises a data term and a regularization term, a processing unit 130 for processing the measurements 115 with an algorithm based on said statistical model which accounts for an energy variation of said plurality of transmission measurements 115 to obtain at least one final component image which has reduced noise, wherein said update equation 125 is employed by said processing unit 130. The data term comprises a counteract weighting factor that is dependent on the respective voxel and on the respective measurement 115. The counteract weighting factor modifies a statistical weight of said respective measurement 115.

In accordance with the present invention, it is proposed to modify the weight with which each measurement contributes to a voxel update on a per voxel basis by additional weights. The typical update equation for the case of modelling Gaussian noise for the measured line integrals looks as follows:

$$\mu_j^{(n+1)} = \mu_j^{(n)} + \frac{\sum_{i=1}^{N_P}\left[a_{ij} \cdot \frac{1}{\sigma_i^2} \cdot (l_i - m_i^{(n)})\right] - \beta \cdot \dot{R}(\mu_j^{(n)})}{\sum_{i=1}^{N_P}\left[a_{ij} \cdot \frac{1}{\sigma_i^2} \cdot a_i\right] - \beta \cdot \ddot{R}(\mu_j^{(n)})} \quad (1)$$

This update equation is modified by inserting additional weights $\omega_{ij}$ as follows:

$$\mu_j^{(n+1)} = \mu_j^{(n)} + \frac{\sum_{i=1}^{N_P}\left[a_{ij} \cdot \omega_{ij} \cdot \frac{1}{\sigma_i^2} \cdot (l_i - m_i^{(n)})\right] - \beta \cdot \dot{R}(\mu_j^{(n)})}{\sum_{i=1}^{N_P}\left[a_{ij} \cdot \omega_{ij} \cdot \frac{1}{\sigma_i^2} \cdot a_i\right] - \beta \cdot \ddot{R}(\mu_j^{(n)})} \quad (2)$$

It is noted that the invention is not necessarily limited to the type of update equation (1) or (2). Rather, all iterative reconstruction algorithms making use of a noise model could use the proposed modification of the statistical weights.

The rationale behind modifying the update equation as proposed is, that by doing so the contribution of each ray is manipulated locally (different for each image voxel) as well as directionally varying (different for each ray direction), leading to a modified equilibrium of data term and regularization term in the sense of better noise uniformity as well as improved noise isotropy across the image if useful $\theta_{ij}$ are chosen.

In contrast, other approaches chose to design the regularization term (cf. the article "Regularization for uniform spatial resolution properties in penalized-likelihood image reconstruction" by J. Stayman et. al., Medical Imaging, IEEE Transactions on, volume 19, pages 601 to 615 (2000), the article "Analytical approach to regularization design for isotropic spatial resolution" by J. Fessler, Nuclear Science Symposium Conference Record, 2003 IEEE, volume 3, pages 2022 to 2026 (2003), the article "Quadratic Regularization Design for 2-D CT" by H. Shi et. al., Medical Imaging, IEEE Transactions on, volume 28, pages 645 to 656 (2009), the dissertation "Fast Regularization Design for Tomographic Image Reconstruction for Uniform and Isotropic Spatial Resolution" by H. R. Shi, The University of Michigan (2008), U.S. Pat. No. 6,324,242, and the article "Quadratic Regularization Design for 3D Axial CT: Towards Isotropic Noise" by J. H. Cho et. al., Nuclear Science Symposium and Medical Imaging Conference (NSS/MIC), IEEE (2013).

The present invention's approach of weighting projection rays, although is mathematically less correct and rather heuristic, is simpler to implement and faster. Especially there is no restriction to quadratic regularization as e.g. in the article "Quadratic Regularization Design for 3D Axial CT: Towards Isotropic Noise" by J. H. Cho et. al., Nuclear Science Symposium and Medical Imaging Conference (NSS/MIC), IEEE (2013). It could also be combined with any iterative reconstruction algorithm that uses a noise model resulting in statistical weights corresponding to inverse variances of the measurements, The approach corresponds to a mismatched Forward-/Backprojector in the iterative reconstruction, something that is commonly used e.g. in SPECT reconstruction. Although a mathematical formulation of the cost function for this case is difficult if not impossible, with such modifications the ML-EM algorithm may still converge. For every projection ray in the forwardprojector, there should be an identical ray in the backprojector so that a point in image space can be backprojected to the same location after projection and backprojection (cf. the article "Unmatched Projector/Backprojector Pairs in an Iterative Reconstruction Algorithm" by G. Zeng et. al., IEEE Transactions on Medical Imaging, volume 19, pages 548 to 555 (2000)).

This is the case here as long as the weight of each ray is modified moderately enough and should be especially true in the presence of a regularization term (MAP reconstruction). In addition such a method may also be used to speed up convergence in early iterations.

Figure 2:
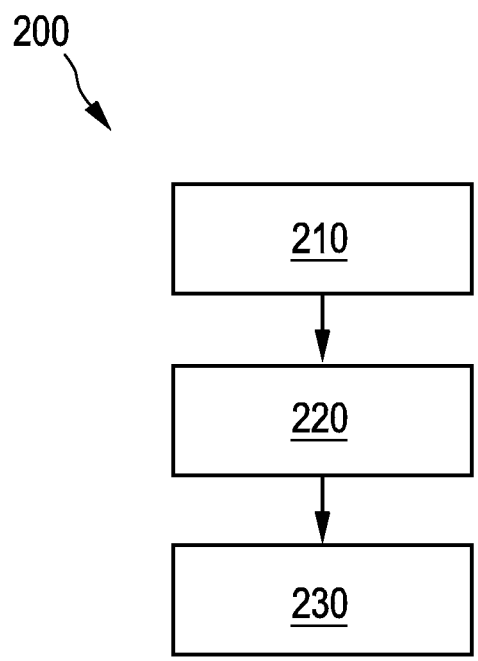
FIG. 2 shows schematically and exemplarily an embodiment of an image reconstruction method.

FIG. 2 shows schematically and exemplarily an embodiment of an image reconstruction method 200 for statistically reconstructing images from a plurality of transmission measurements 115. In a step 210, a plurality of transmission measurements 115 is provided. In a step 220, an update equation 125 based on an iterative statistical model is provided. Update equation 125 comprises a data term and a regularization term. In a step 230, the measurements 115 are processed with an algorithm based on said statistical model which accounts for an energy variation of said plurality of transmission measurements 115 to obtain at least one final component image which has reduced noise. Update equation 125 is employed by processing step 230. The data term comprises a counteract weighting factor that is dependent on the respective voxel and on the respective measurement 115. The counteract weighting factor modifies a statistical weight of said respective measurement 115.

To obtain the $\omega_{ij}$ the following considerations may be used:

Assuming a fully converged image, there is equilibrium between the contributions of data term and regularization term in the numerator of the above equation. The data term will include noise from the measured line integrals L. The variance in the data term contribution to the numerator can be expressed via the variances of the measurements as $$\sigma_d^2(j) = \sum_{i=1}^{N_P} \frac{a_{ij}^2}{\sigma_i^4} \cdot \sigma_i^2 \Longrightarrow \sigma_d^2(j) = \sum_{i=1}^{N_P} a_{ij}^2 \cdot \frac{1}{\sigma_i^2} \quad (3)$$

This corresponds to the residual error in case the regularization works perfectly, that is, it perfectly removes all measurement noise related contributions to the image.

In addition each noisy measurement $l_i$ corresponds to a (noisy) line-integral along the current ray through voxel j under a certain angle $\varphi_i$. The noise contribution of a ray to a certain direction $\varphi_r$ corresponds to the projection onto this direction, using $\cos^2$ of the angle between the ray and direction in question.

The total noise contribution of all rays to the perpendicular of a current ray ($\varphi_r$) is thus $$\sigma_d^2(r, j) = \sum_i \frac{a_{ij}^2}{\sigma_i^4}[\sigma_i^2 \cos^2(\varphi_r - \varphi_i)] = \sum_i a_{ij}^2 \frac{1}{\sigma_i^2} \cos^2(\varphi_r - \varphi_i) \quad (4)$$

Again given perfect regularization, this is the local noise in the converged image along a certain direction.

One straightforward approach is to choose $$\omega_{ij} = \sigma_i \quad (5)$$

in which case the directional noise would become $$\sigma_d^2(r, j) = \sum_i a_{ij}^2 \omega_{ij}^2 \frac{1}{\sigma_i^2} \cos^2(\varphi_r - \varphi_i) = \sum_i a_{ij}^2 \cos^2(\varphi_r - \varphi_i) \quad (6)$$

If the $a_{ij}$ are identical for all i, this is independent of $\varphi_r$. This would however only be the case for a parallel beam geometry.

In case the $a_{ij}$ are not identical for all i, the $a_{ij}$ can be normalized to become fully or approximately independent of i. The normalization factor can be included into the counteract weights $\omega_{ij}$. An exact normalization is only possible for specific geometries. In general we thus use a system acquisition geometry independent, approximative normalization according to $$\omega_{ij} = \frac{\sigma_i}{\sum_v a_{vj} \cos^2(\varphi_v - \varphi_i)} \text{ or} \quad (7)$$

$$\omega_{ij} = \frac{\sigma_i}{\sqrt{\sum_v a_{vj}^2 \cos^2(\varphi_v - \varphi_i)}}$$

Since however the implementation would be extremely simple, it is a valid choice to choose a suitably parameterized function of $\sigma_i$ such as e.g.

$$f_\sigma(\sigma_i) = (\sigma_i)^n \text{ with } n \in [0,2] \quad (8)$$

Since however experiments showed some robustness issues with respect to object dependency in the parameterization of the above a second approach was chosen:

The contribution of the i-th ray to the update of the j-th voxel is weighted to counteract the relative directional noise perpendicular to its direction:

$$\omega_{ij} = \frac{1}{f_d\left(\frac{\sigma_d^2(i, j)}{\sigma_d^2(j)}\right)} \quad (9)$$

$$\sigma_d^2(j) = \sum_v \frac{a_{vj}^2}{\sigma_v^2}$$

$$\sigma_d^2(i, j) = \sum_v \frac{a_{vj}^2}{\sigma_v^2} \cos^2(\varphi_v - \varphi_i)$$

$$f_d(x) = (x)^{n_d}$$

The modification of the weights based on the ray's directions (in (7) or (9)) indirectly also modifies the overall statistical weight of all measurements. In order to achieve or restore improved noise uniformity the $\omega_{ij}$ are additionally normalized according to $$\omega'_{ij} = \frac{\omega_{ij}}{f_w\left(\sum_v \frac{a_{vj}^2 \omega_{vj}^2}{\sigma_v^2}\right)}; f_w(x) = (x)^{n_w} \quad (10)$$

The parameters $n_w$ and $n_d$ are used to empirically optimize the setup. This becomes necessary, since the assumptions resulting in the variance of the data term in equations (3) and (4) are only approximative. Other functions and parameterizations for $f_w, f_\sigma$ and $f_d$ in (8), (9) and (10) could be used.

It should be mentioned, that a slice by slice normalization of the weights along z might become necessary in case of helical scans covering body regions of varying extent with varying measurement noise along z (unless perfect dose modulation would be possible). Otherwise dose utility will be lost in regions of low noise (small extent) in terms of resolution. Such an alternative approach proposes to use the same argument to calculate weights for noise uniformity but applies them to the β in the update equation and not to the data term. However, a purely voxel dependent weight (i.e., ray-independent) can be applied either to the regularization term or its inverse can be applied to the data term with the identical effect. Thus, the alternative approach can also be used here to modify the $\sigma_w^2(j)$ along z.

Figure 3A:
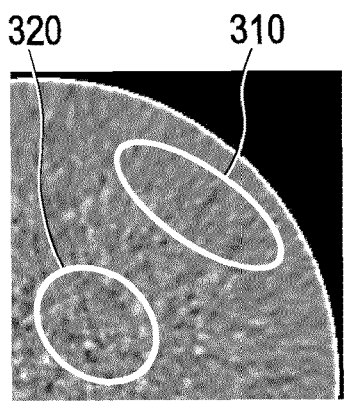
FIGS. 3A to 3F show schematically and exemplarily different image reconstruction results for a simulated water phantom.
Figure 3B:
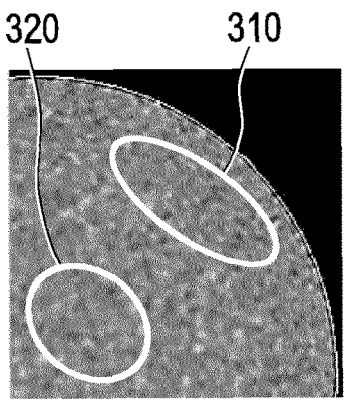
Figure 3C:
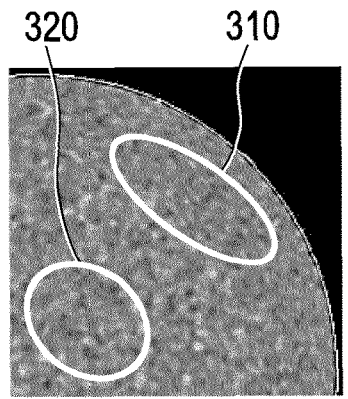
Figure 3D:
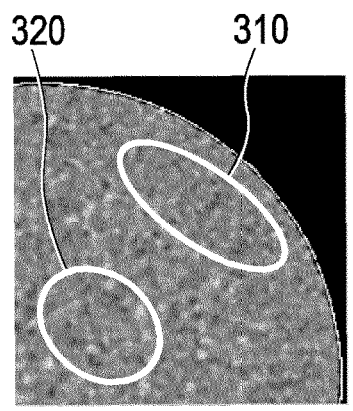
Figure 3E:
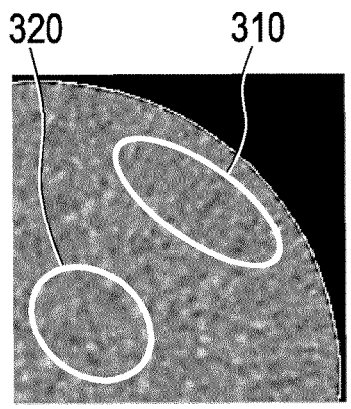
Figure 3F:
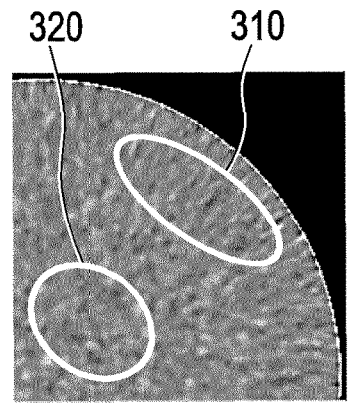

FIGS. 3A to 3F show schematically and exemplarily different image reconstruction results for a 350 mm simulated water phantom, circular trajectory. FIG. 3A shows a reconstructed image, where no noise model was used, that is update equation (1) with all $\sigma_i^2$ fixed to 1. To obtain the image shown in FIG. 3B, a penalized Maximum Likelihood (ML) reconstruction method in accordance with equation (1) is applied. To obtain the image shown in FIG. 3C, a penalized Maximum Likelihood reconstruction method in accordance with equation (1) using β-weighting is applied in accordance with International Application no. PCT/EP2014/070424 with a spatially varying β to achieve improved noise uniformity. FIGS. 3D to 3F show images reconstructed in accordance with the present invention, where the $\omega_{ij}$ have been determined in accordance with equation (9) and (10), and where specifically $n_d$=0.6, $n_w$=0.25 in FIG. 3D, $n_d$=1.0, $n_w$=0.25 in FIG. 3E, and $n_d$=2.0, $n_w$=0.5 in FIG. 3F. As indicated by marked-up regions 310, 320 and further described in the following, different images "features" are obtained depending on the reconstruction method chosen. In FIG. 3A, a radial smearing can be observed in region 310. That is, the images exhibit radial-like structures. In contrast, for a standard penalized Maximum Likelihood reconstruction including a noise model and without (FIG. 3B) and with β-weighting (FIG. 3C), tangential noise smearing is observed (i.e., the image exhibits structures in a tangential direction, see regions 310). While in region 320 of FIG. 3B, the image is considerably smoothed as compared to region 310 in FIG. 3B, the previously proposed β-weighting shows better noise uniformity (compare regions 310 and 320 in FIG. 3C) without however affecting the anisotropic appearance in region 310 in both FIGS. 3B and 3C. As may be seen in FIGS. 3D to 3F, tangential noise smearing is eliminated and then turns into radial smearing as $n_d$ increases. In particular, for $n_d$=1.0, $n_w$=0.25 (FIG. 3E), there is less tangential smearing in the outer region 320 of FIG. 3E and little noise difference between inner region 310 and outer region 320 of FIG. 3E.

Figure 4A:
FIGS. 4A to 4C show schematically and exemplarily different image reconstruction results for a brain reconstruction.
Figure 4B:
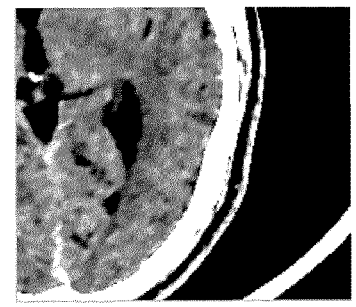
Figure 4C:
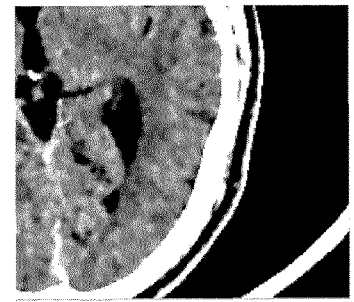

FIGS. 4A to 4C show schematically and exemplarily different image reconstruction results for a brain reconstruction (shown with a window of 40 Hounsfield Units (HU) at a mean level of 35 HU). FIG. 4A shows an image reconstructed in accordance with the present invention, where the $\omega_{ij}$ have been determined in accordance with equation (9) and (10), and where specifically $n_d$=1.0, $n_w$=0.25. The choice of $n_d$=1.0, $n_w$=0.25 in FIG. 4A is motivated by the fact that there is less tangential smearing in the outer region 320 of FIG. 3E, and by the fact that there is little noise difference between inner region 310 and outer region 320 of FIG. 3E. To obtain the image shown in FIG. 4B, a penalized Maximum Likelihood reconstruction method is used in accordance with equation (1) in combination with a spatially varying β in accordance with International Application no. PCT/EP2014/070424. FIG. 4C shows a reconstructed image, where no noise model was used, that is update equation (1) with all $\sigma_i^2$ fixed to 1. Standard penalized Maximum Likelihood reconstruction exhibits a slight tangential smearing in the noise pattern, which is removed with the proposed method (cf. FIG. 4A), similar to using no variances at all but at a slightly better contrast. From comparing the images shown in FIGS. 4A to 4C, it can be seen that determining $n_d$, $n_w$ by means of a test sample (here: a simulated 350 mm water phantom used in FIGS. 3A thru 3F) and applying the thusly-obtained parameters to an actual medical image yields improved results. Consequently, assuming that $n_d$, $n_w$ may be translated from a first reconstruction to different reconstructions is appropriate.

An example application of the invention is generally in iterative CT-reconstructions. The invention is especially useful for all reconstructions with large coverage. So far, improvements have been seen in all clinical reconstructions on which the described methods were applied.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems. The term "computer program" may also refer to embedded software.

Any reference signs in the claims should not be construed as limiting the scope.

The present invention relates to an image reconstruction system for statistically reconstructing images from a plurality of transmission measurements. Image reconstruction system comprises an update equation providing unit for providing an update equation based on an iterative statistical model, wherein said update equation comprises a data term and a regularization term. The invention proposes to not modify the regularization term, but rather the weights with which individual measurements contribute are modified on a per image voxel and per measurement basis. This is achieved through modification of the contributions of each measurement by including an additional weight on a per image voxel/per measurement basis. The additional weight for each measurement is determined by calculating the noise perpendicular to each measurement ray at each voxel position and a voxel and measurement dependent weight for each measurement. The additional weight is integrated into the data term of the update equation.

The invention claimed is:

1. An image reconstruction system for statistically reconstructing images from a plurality of transmission measurements in computed tomography, comprising:
at least one processor configured to:
provide a plurality of transmission measurements;
provide an update equation based on an iterative statistical model, wherein said update equation comprises a data term and a regularization term; and
use the update equation to process the plurality of transmission measurements based on said iterative statistical model, which accounts for an energy variation of said plurality of transmission measurements, to obtain at least one final component image having reduced noise; wherein said data term comprises a counteract weighting factor that is dependent on respective voxel and measurement, and wherein said counteract weighting factor modifies a statistical weight of said respective measurement.

2. The image reconstruction system of claim 1, wherein said update equation reads $$\mu_j^{(n+1)} = \mu_j^{(n)} + \frac{\sum_{i=1}^{N_P} \left[ a_{ij} \cdot \omega_{ij} \cdot \frac{1}{\sigma_i^2} \cdot (l_i - m_i^{(n)}) \right] - \beta \cdot \dot{R}(\mu_j^{(n)})}{\sum_{i=1}^{N_P} \left[ a_{ij} \cdot \omega_{ij} \cdot \frac{1}{\sigma_i^2} \cdot a_i \right] + \beta \cdot \ddot{R}(\mu_j^{(n)})},$$

wherein $\mu_j^{(n+1)}$ corresponds to the subsequent reconstructed value of a voxel j during iteration step n+1, $\mu_j^{(n)}$ corresponds to the value of said voxel j during iteration step n, $a_{ij}$ corresponds to the intersection of voxel j with a ray belonging to a measurement i, $\omega_{ij}$ corresponds to said counteract weighting factor, $\sigma_i$ corresponds to the variance of said measurement i, $l_i$ corresponds to a line integral measured during said measurement i, $m_i^{(n)}$ corresponds to a line integral for said measurement i simulated during iteration step n, $a_i$ corresponds to a normalization resulting from a mathematical optimization, $N_P$ corresponds to the total number of measurements, $\beta$ corresponds to a regularization parameter, and R corresponds to a regularization term, wherein $\dot{R}$ corresponds to the first derivative with respect to $\mu_j^{(n)}$, and wherein $\ddot{R}$ corresponds to the second derivative with respect to $\mu_j^{(n)}$.

3. The image reconstruction system of claim 1, wherein a measurement ray having a ray direction is assigned to each measurement of said plurality of transmission measurements, and wherein said counteract weighting factor is chosen to manipulate a contribution of said measurement ray depending on the respective voxel and depending on the respective ray direction.

4. The image reconstruction system of claim 1, wherein said counteract weighting factor is dependent on a variance of the respective measurement.

5. The image reconstruction system of claim 1, wherein said counteract weighting factor is proportional to a variance of the respective measurement.

6. The image reconstruction system of claim 1, wherein said counteract weighting factor is proportional to $(\sigma_i)^n$, where $\sigma_i$ corresponds to a variance of the respective measurement, and where n is a real number.

7. The image reconstruction system of claim 1, wherein a measurement ray having a ray direction is assigned to each measurement of said plurality of transmission measurements, and wherein said counteract weighting factor is configured to counteract relative directional noise perpendicular to said ray direction.

8. The image reconstruction system of claim 1, wherein said counteract weighting factor is determined by $$\omega_{ij} = \frac{(\sigma_i)^{n_d}}{\sum_v a_{vj} \cos^2(\varphi_v - \varphi_i)} \text{ or}$$

$$\omega_{ij} = \frac{(\sigma_i)^{n_d}}{\sqrt{\sum_v a_{vj}^2 \cos^2(\varphi_v - \varphi_i)}}$$

wherein $a_{vj}$ corresponds to the intersection of voxel j with a ray belonging to a measurement v, $\omega_{ij}$ corresponds to said counteract weighting factor for voxel j and measurement i, $\sigma_i$ corresponds to the variance of said measurement v, $\varphi_i$ corresponds to an angle of a measurement ray direction for measurement i, and where $n_d$ corresponds to a predetermined parameter.

9. The image reconstruction system of claim 1, wherein said counteract weighting factor is determined by $$\omega_{ij} = \frac{1}{f_d \left( \frac{\sigma_d^2(i, j)}{\sigma_d^2(j)} \right)}$$

$$\sigma_d^2(j) = \sum_v \frac{a_{vj}^2}{\sigma_v^2}$$

$$\sigma_d^2(i, j) = \sum_v \frac{a_{vj}^2}{\sigma_v^2} \cos^2(\varphi_v - \varphi_i)$$

$$f_d(x) = (x)^{n_d},$$

wherein $a_{vj}$ corresponds to the intersection of voxel j with a ray belonging to a measurement v, $\omega_{ij}$ corresponds to said counteract weighting factor for voxel j and measurement i, $\sigma_v$ corresponds to the variance of said measurement v, $\varphi_i$ corresponds to an angle of a measurement ray direction for measurement i, and where $n_d$ corresponds to a predetermined parameter.

10. The image reconstruction system of claim 1, wherein said image reconstruction system is further configured to normalize said counteract weighting factor by dividing said counteract weighting factor by $$\left( \sum_v \frac{a_{vj}^2 \omega_{vj}^2}{\sigma_v^2} \right)^{n_\omega}$$

wherein $\omega_{vj}$ corresponds to said counteract weighting factor for voxel j and measurement v, $a_{vj}$ corresponds to the intersection of voxel j with a ray belonging to a measurement v, $\sigma_v$ corresponds to the variance of said measurement v, and where $n_w$ corresponds to a predetermined parameter.

11. The image reconstruction system of claim 8, wherein $n_d$ is larger than or equal to 0.

12. The image reconstruction system of claim 10, wherein $n_w$ is larger than or equal to 0.

13. An image reconstruction method for statistically reconstructing images from a plurality of transmission measurements in computed tomography, the method comprising:
providing a plurality of transmission measurements;
providing an update equation based on an iterative statistical model, wherein said update equation comprises a data term and a regularization term; and
using the update equation to process the plurality of transmission measurements based on said statistical model, which accounts for an energy variation of said plurality of transmission measurements, to obtain at least one final component image having reduced noise;
wherein said data term comprises a counteract weighting factor that is dependent on respective voxel and measurement, and wherein said counteract weighting factor modifies a statistical weight of said respective measurement.

14. A non-transitory computer-readable medium having one or more executable instructions stored thereon, which, when executed by a processor, cause the processor to perform an image reconstruction method for statistically reconstructing images from a plurality of transmission measurements in computed tomography, the method comprising:

providing a plurality of transmission measurements;

providing an update equation based on an iterative statistical model, wherein said update equation comprises a data term and a regularization term; and using the update equation to process the plurality of transmission measurements based on said statistical model, which accounts for an energy variation of said plurality of transmission measurements, to obtain at least one final component image having reduced noise; wherein said data term comprises a counteract weighting factor that is dependent on respective voxel and measurement, and wherein said counteract weighting factor modifies a statistical weight of said respective measurement.

* * * * *